United States Patent
Dayan et al.

(10) Patent No.: US 12,026,294 B2
(45) Date of Patent: *Jul. 2, 2024

(54) SECURITY ADJUSTMENTS IN MOBILE DEVICES

(71) Applicant: Google LLC, Mountain View, CA (US)

(72) Inventors: Tal Dayan, Los Gatos, CA (US); Maya Ben Ari, Palo Alto, CA (US); Brandon Keely, San Francisco, CA (US); Subir Jhanb, Sunnyvale, CA (US); Ido Ofir, Los Altos, CA (US)

(73) Assignee: Google LLC, Mountain View, CA (US)

( * ) Notice: Subject to any disclaimer, the term of this patent is extended or adjusted under 35 U.S.C. 154(b) by 110 days.

This patent is subject to a terminal disclaimer.

(21) Appl. No.: 17/118,976

(22) Filed: Dec. 11, 2020

(65) Prior Publication Data

US 2021/0192094 A1 Jun. 24, 2021

Related U.S. Application Data

(63) Continuation of application No. 16/125,548, filed on Sep. 7, 2018, now Pat. No. 10,896,268, which is a
(Continued)

(51) Int. Cl.
*G06F 11/30* (2006.01)
*G06F 21/34* (2013.01)
*G06F 21/79* (2013.01)
*G06F 21/87* (2013.01)
*H04L 9/40* (2022.01)

(52) U.S. Cl.
CPC .......... *G06F 21/87* (2013.01); *G06F 11/3051* (2013.01); *G06F 11/3058* (2013.01); *G06F 21/34* (2013.01); *G06F 21/79* (2013.01); *H04L 63/20* (2013.01); *G06F 2221/2149* (2013.01)

(58) Field of Classification Search
CPC .......... G06F 21/78; G06F 21/79; G06F 21/87
See application file for complete search history.

(56) References Cited

U.S. PATENT DOCUMENTS 7,304,570 B2 12/2007 Thomas et al.
7,752,255 B2 7/2010 Cohen et al.
(Continued)

FOREIGN PATENT DOCUMENTS

CN 101616495 12/2009
CN 103501483 1/2014

OTHER PUBLICATIONS

European Patent Office, Communication pursuant to Article 94(3) EPC dated Sep. 17, 2018, issued in connection with European Patent Application No. 14739046.9, 4 pages.
(Continued)

*Primary Examiner* — Linglan Edwards
(74) *Attorney, Agent, or Firm* — McDonnell Boehnen Hulbert & Berghoff LLP

(57) ABSTRACT

Systems, device and techniques are disclosed for implementing a security configuration change based on one or more base events and a current security configuration. An inference module may identify a security configuration change based on receiving base events from a state storage/event listener and analyzing the base events to determine if a current security configuration is optimal given the base events.

20 Claims, 6 Drawing Sheets

Related U.S. Application Data continuation of application No. 15/641,121, filed on Jul. 3, 2017, now abandoned, which is a continuation of application No. 14/310,544, filed on Jun. 20, 2014, now Pat. No. 9,697,385.

(56) References Cited

U.S. PATENT DOCUMENTS

| | | | |
|---|---|---|---|
| 7,865,726 | B2 | 1/2011 | Corley et al. |
| 8,095,112 | B2 | 1/2012 | Chow et al. |
| 8,112,066 | B2 | 2/2012 | Ben Ayed |
| 8,423,483 | B2 | 4/2013 | Sadeh-Koniecpol et al. |
| 8,613,070 | B1 * | 12/2013 | Borzycki ............ H04L 67/567 |
| | | | 726/8 |
| 8,868,038 | B2 * | 10/2014 | Cherian ............... H04W 12/50 |
| | | | 455/418 |
| 8,918,872 | B2 | 12/2014 | Kumar et al. |
| 8,966,656 | B2 | 2/2015 | Hirsch et al. |
| 8,995,960 | B2 * | 3/2015 | Miller ................... H04W 4/80 |
| | | | 455/411 |
| 8,997,229 | B1 | 3/2015 | Huang et al. |
| 9,141,828 | B2 | 9/2015 | Jung et al. |
| 9,229,489 | B2 | 1/2016 | Toksvig et al. |
| 9,432,361 | B2 * | 8/2016 | Mahaffey .......... H04L 63/0853 |
| 9,697,385 | B2 | 7/2017 | Dayan et al. |
| 9,864,425 | B2 | 1/2018 | Toksvig et al. |
| 2002/0089528 | A1 | 7/2002 | Hay et al. |
| 2004/0250107 | A1 | 12/2004 | Guo |
| 2005/0273851 | A1 * | 12/2005 | Raju Datla ......... H04L 63/1425 |
| | | | 726/14 |
| 2006/0020814 | A1 | 1/2006 | Lieblich et al. |
| 2010/0077484 | A1 | 3/2010 | Paretti et al. |
| 2010/0299716 | A1 | 11/2010 | Rouskov et al. |
| 2012/0185910 | A1 | 7/2012 | Mettinen et al. |
| 2013/0081104 | A1 | 3/2013 | Jung et al. |
| 2013/0103943 | A1 | 4/2013 | Hirsch et al. |
| 2013/0109352 | A1 | 5/2013 | Obaidi |
| 2013/0244615 | A1 | 9/2013 | Miller |
| 2013/0268140 | A1 * | 10/2013 | Du ........................ G08C 17/02 |
| | | | 701/2 |
| 2013/0281140 | A1 | 10/2013 | Rubin et al. |
| 2013/0326611 | A1 | 12/2013 | Gargi |
| 2014/0173738 | A1 | 6/2014 | Condry et al. |
| 2014/0280236 | A1 | 9/2014 | Faller et al. |
| 2014/0282825 | A1 | 9/2014 | Bitran et al. |
| 2014/0282877 | A1 | 9/2014 | Mahaffey et al. |
| 2014/0359750 | A1 | 12/2014 | Adams et al. |
| 2015/0120583 | A1 | 4/2015 | Zarrella |
| 2015/0193239 | A1 | 7/2015 | Dolph et al. |
| 2015/0222665 | A1 * | 8/2015 | Eberlein ................ H04L 63/10 |
| | | | 726/1 |
| 2015/0281950 | A1 | 10/2015 | Carr |
| 2015/0289132 | A1 | 10/2015 | Zhang et al. |
| 2015/0371064 | A1 | 12/2015 | Dayan et al. |
| 2017/0316229 | A1 | 11/2017 | Dayan et al. |

OTHER PUBLICATIONS

International Bureau, International Preliminary Report on Patentability dated Dec. 29, 2016 issued in connection with International Patent Application No. PCT/US2015/035736, filed on Jun. 15, 2015, 7 pages.

International Searching Authority, International Search Report and Written Opinion dated Sep. 11, 2015, issued in connection with International Patent Application No. PCTIUS2015/035736, filed on Jun. 15, 2015, 20 pages.

Sharifi et al., "Learning of Personalized Security Settings," Systems Man and Cybernetics (SMC), 2010 IEEE International Conference On, IEEE, Piscataway, NJ, USA, Oct. 10, 2010, pp. 3428-3432.

* cited by examiner

SECURITY ADJUSTMENTS IN MOBILE DEVICES

CROSS-REFERENCE TO RELATED APPLICATIONS

This patent application is a continuation of U.S. patent application Ser. No. 16/125,548 entitled "Security Adjustments in Mobile Devices" and filed on Sep. 7, 2018, which is a continuation of U.S. patent application Ser. No. 15/641,121 entitled "Security Adjustments in Mobile Devices" and filed on Jul. 3, 2017, which is a continuation of U.S. patent application Ser. No. 14/310,544 entitled "Security Adjustments in Mobile Devices", filed on Jun. 20, 2014, and issued as U.S. Pat. No. 9,697,385, the contents of all of which are entirely incorporated by reference herein for all purposes.

BACKGROUND

Traditional mobile devices contain either too few security features that can either be turned on or off (e.g., enable/disable lock code) or too many security features such that a user may be unable to determine the benefits and drawbacks of all the features. An average user may not be equipped to access the security settings of their mobile device and determine the optimal security configuration for that device. Such complexity may result in the reduction of security as a user may opt to avoid using available security features due to lack of understanding. Alternatively, the complexity may result in an undesirable user experience as the user may select security options that do not suit her needs.

BRIEF SUMMARY

According to implementations of the disclosed subject matter, one or more base events may be received at an event listener. A base event may be, for example, a number of unlocks, a pairing with an external device, a logon event, a sensor value, a device location, a security update or the like. The one or more base events may be stored at a state storage and may be provided to an inference module from the state storage. Prior to providing the one or more base events, the one or more base events may be summarized. A current security configuration may be provided to the inference module. The inference module may identify a security configuration change based on the one or more base events and the current security configuration. A suggestion corresponding to the security configuration change, and including a metric of expected improvement or expected security benefit, may be provided to a user and, upon approval from the user, may result in changing the current security configuration.

According to implementations of the disclosed subject matter, a means to receive one or more base events at an event listener are provided, where the a one or more base events may be a number of unlocks, a pairing with an external device, a logon event, a sensor value, a device location, a security update or the like. The one or more base events may be stored at a stage storage and provided to an inference module. A current security configuration may be provided to the inference module. Means may be provided for the inference module to identify a security configuration change based on the one or more base events and the current security configuration. A suggestion corresponding to the security configuration change, and including a metric of expected improvement or expected security benefit, may be provided to a user and, upon approval from the user, may result in changing the current security configuration.

Systems and techniques according to the present disclosure allow identifying a security configuration change and providing a suggested change, including a metric of expected improvement or expected security. Additional features, advantages, and implementations of the disclosed subject matter may be set forth or apparent from consideration of the following detailed description, drawings, and claims. Moreover, it is to be understood that both the foregoing summary and the following detailed description include examples and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

DETAILED DESCRIPTION

Techniques disclosed herein enable identification of a security configuration change based on one or more base events. A security configuration may be a setting that enables access to a mobile device (e.g., a password). Base events are events that occur on, related to, or around the mobile device such as pairing with a blue tooth device. As an example, a current security configuration may be that a user has to input a 4 digit code into her phone to gain access to the phone. A connection to a Bluetooth device may be detected and, while connected to the Bluetooth device, the user may access her phone 20 times by inputting the 4 digit code into her phone. The next time that the Bluetooth device is detected, the user may be presented with a prompt that suggest that the user add the Bluetooth device to a trusted device list and that doing so will save the user an average of 20 unlocks per day. If the user opts to add the Bluetooth device as a trusted device, then the user may not be required to input the 4 digit code if the Bluetooth device is connected to the user's phone.

Figure 1:
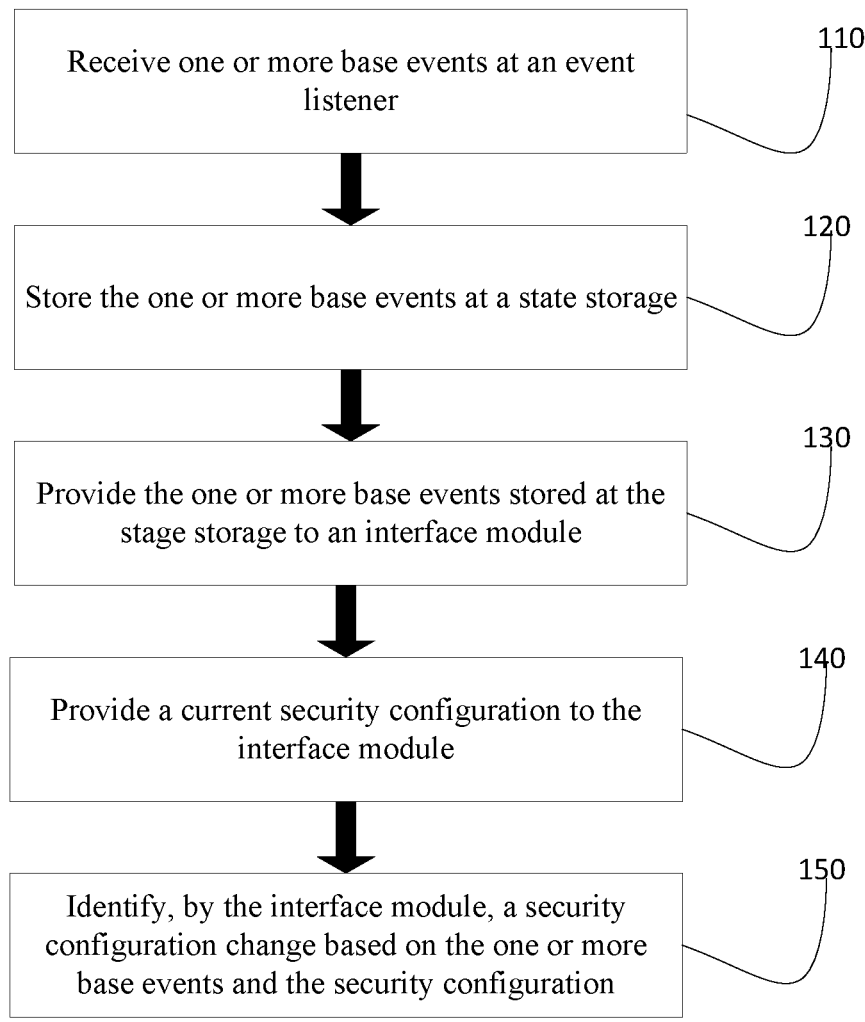
FIG. 1 shows an example process for identifying a security configuration change, according to an implementation of the disclosed subject matter.

According to an implementation of the disclosed subject matter, as shown in FIG. 1 at step 110, one or more base events may be received at an event listener. An event listener may be configured to detect and/or receive base events. The event listener may detect a base event using a sensor such as an accelerometer, GPS sensor, other location based sensor, touch input sensor, or the like. As an example, an event listener may be able to determine that a user is located at the user's home based on a reading from a GPS sensor that corresponds to the user's home. An event listener may receive base events from the device itself or software associated with the device configured to provide base vent information to the event listener. An example of receiving base event information includes the operating system running on a user's mobile device providing information indicating that a user has successfully input a passcode and gained access to the user device. As another example of receiving base event information, the event listener may receive information corresponding to a connection with a Bluetooth device from a mobile device.

A base event may be any event that occurs on, around, or related to a mobile device such as one or more unlocks, a paring with an external device, a logon event, a sensor value, a security update and a device location. The one or more unlocks may correspond to a number of times a device is unlocked or accessed either by using a password or without. The one or more unlocks may also be associated with information regarding how long the device remained unlocked, what actions were taken while the device was unlocked, or the like. A pairing with an external device may correspond to a connection between a mobile device and an external device such as a communication device (e.g., headset, microphone, speaker, monitor, etc.), a content publishing device (e.g., a device configured to cast information), a controllable device (e.g., a remote control, home appliance, gadget, etc.) configured to be controlled by the mobile device, a computer, laptop, electronic device, or the like. The connection between a mobile device and the external device may be established using any applicable format such as Bluetooth, Wi-Fi, infrared, near field communication, or the like. A logon event may be a user unlocking a device or gaining access to protected information, application, web location, or the like. A sensor value may be a value received from a sensor internal or external to a device such as an accelerometer, barometer, proximity sensor, or the like. A security update may be information provided by the device or an external entity such as a web server, website, or the like. A device location may be determined based on any applicable location based service such as triangulation, GPS detection, source analysis (e.g., Wi-Fi router location analysis, base station analysis, etc.), or the like.

According to an implementation of the disclosed subject matter, a base event may be an inferred event. An inferred event may correspond to an inference made based on one or more explicit events. An inferred event may suggest, but not explicitly indicate, a change in environment with respect to security. An example of an inferred event, a mobile device may be in connection with a Bluetooth device that indicates that a mobile device is in a secure setting as it is unlikely that the mobile device is separated from a user if the mobile device is connected to a trusted Bluetooth device. As another example of an inferred event, a device location at which multiple logon events are received at various times may be inferred to correspond to a secure location based on the multiple logon events at various times. An inferred base event may be generated at an event listener, a state storage, or an inference module, as disclosed herein.

According to implementations of the disclosed subject matter, as shown at step 120 in FIG. 1, one or more base events received by the event listener may be stored at a state storage. The one or more base events may be provided from the event listener to the state storage either as the event listener receives a base event, at a period rate, when a predetermined number of base events have accumulated at the event listener, or the like. The base events may be provided to the state storage unedited or may be summarized prior to being provided to the state storage for storage. Summarization may be include one or more of compressing, encrypting, analyzing, condensing, or the like. As an example of summarization, 5 unlocks of a mobile device may be detected by the event listener, each unlock having an associated duration of staying unlocked (e.g., 10 seconds). Prior to being stored at the state storage, the 5 unlocks may be summarized to indicate that there were 5 unlocks at an average of 8 seconds. Here, the 8 seconds may be the average time, of the 5 unlocks, that the device remained unlocked. The summarization may occur at the event listener, at the state storage, or elsewhere.

According to implementations of the disclosed subject matter, as shown at step 130 in FIG. 1, the one or more explicit or inferred base events may be provided to an inference module. Here, either a summarized or an unsummarized version of the one or more base events may be provided to the inference module.

Similarly, as shown at step 140, a current security configuration may be provided to the inference module. A current security configuration may be provided by a local or remote database, a local or remote server, a cloud server, or the like. A current security configuration may be the settings that are currently in place and correspond to an aspect of securing a user device or user data. Security configurations may include a device lock timeout (e.g., duration of device lock), a password strength (password length, password complexity, etc.), a password type (an alphanumeric password, a symbol based password, a gesture, a sequence, a selection, etc.), or the like. A current security configuration may be selected by a user or may be established automatically based on predetermined settings or criteria. As an example of a device lock timeout security configuration, a user device may be unlocked by the user by gesturing from left to right on a mobile phone touchscreen. Subsequent to unlocking of the mobile phone, the device may remain unlocked for a predetermined amount of time. As another example of a device lock timeout security configuration, a user may unlock a device by gesturing from left to right and then inputting a 4 digit code to access the mobile phone. Once the user inputs the 4 digit code, the user may not be required to input the 4 digit code again for a given amount of time. As an example of a password strength, a user may be required to input a password containing both numbers and alphabets to access her tablet. As an example of a password type, a user may be required to input a shape by touching the touchscreen on her mobile phone to gain access to a banking application on the mobile phone.

According to implementations of the disclosed subject matter, at step 150, the interface module may identify a security configuration change based on the one or more explicit or inferred base events received at step 130 and the current security configuration received at step 140. The security configuration change may correspond to either improving a user experience, to improving the expected security for the user/user device, or the like. The inference module may identify the change in security configuration by making an association between the one or more base events and the current security configuration.

Figure 2:
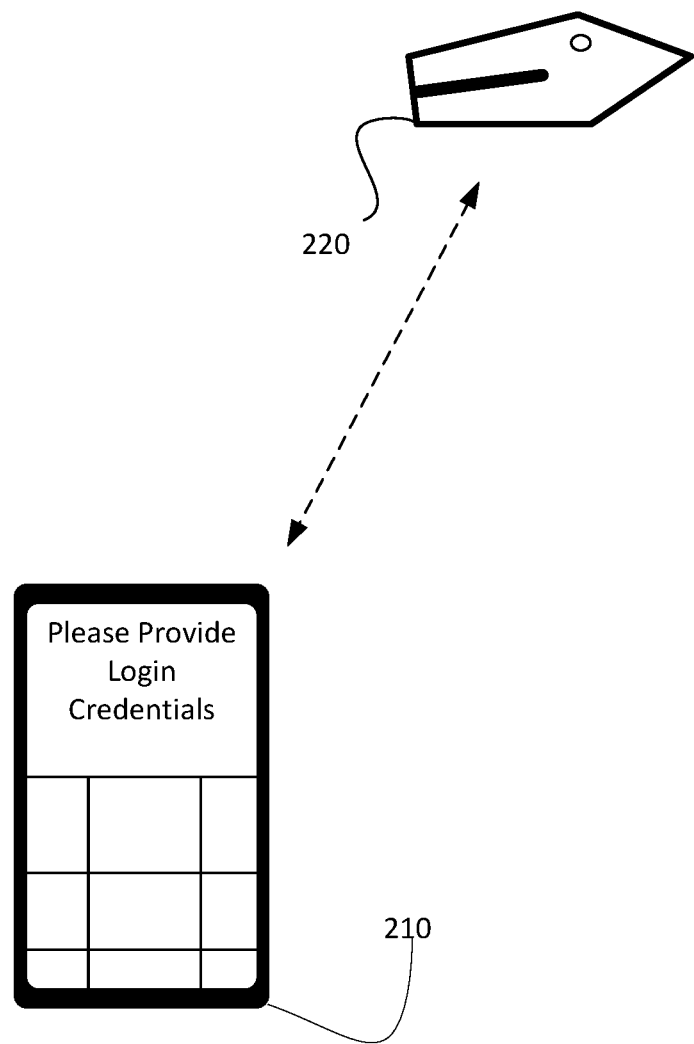
FIG. 2 shows a device pairing with an external device according to an implementation of the disclosed subject matter.

As an illustrative example, as shown in FIG. 2, a mobile device 210 may be connected to a Bluetooth headset 220 via a Bluetooth connection. While the mobile device 210 is connected to the Bluetooth headset 220, the user may access the mobile device 210 by inputting a 4 digit code using the mobile device's touchscreen. The user may access mobile device 14 times within an hour, while connected to the Bluetooth headset 220. An event listener may detect that the mobile device 210 is in connection with the Bluetooth headset 220 and provide that information to a state storage. The event listener may also receive an indication that the mobile device 210 was unlocked 14 times within an hour while connected to the Bluetooth headset 220. Both the connection to the Bluetooth device 220 information as well as the unlocking 14 times information may be summarized and stored at a state storage. At a periodic check point, the summarized information may be provide to an inference module. The inference module may also receive the current security configuration information corresponding to the 4 digit passcode being required to gain access to the mobile phone, from a security configuration module. The inference module may the information in Table 1 available to it.

TABLE 1

| Information | Source |
| --- | --- |
| Bluetooth headset connection | Event Listener |
| 14 unlocks within an hour | Event Listener |
| 4 digit passcode | Security Configuration module |

Continuing the example, the inference module may determine that if the Bluetooth headset 220 is designated as a trusted device, trusted such that the security configuration can be modified to not require the 4 digit passcode, then the user may save 14 screen unlocks.

Figure 3:
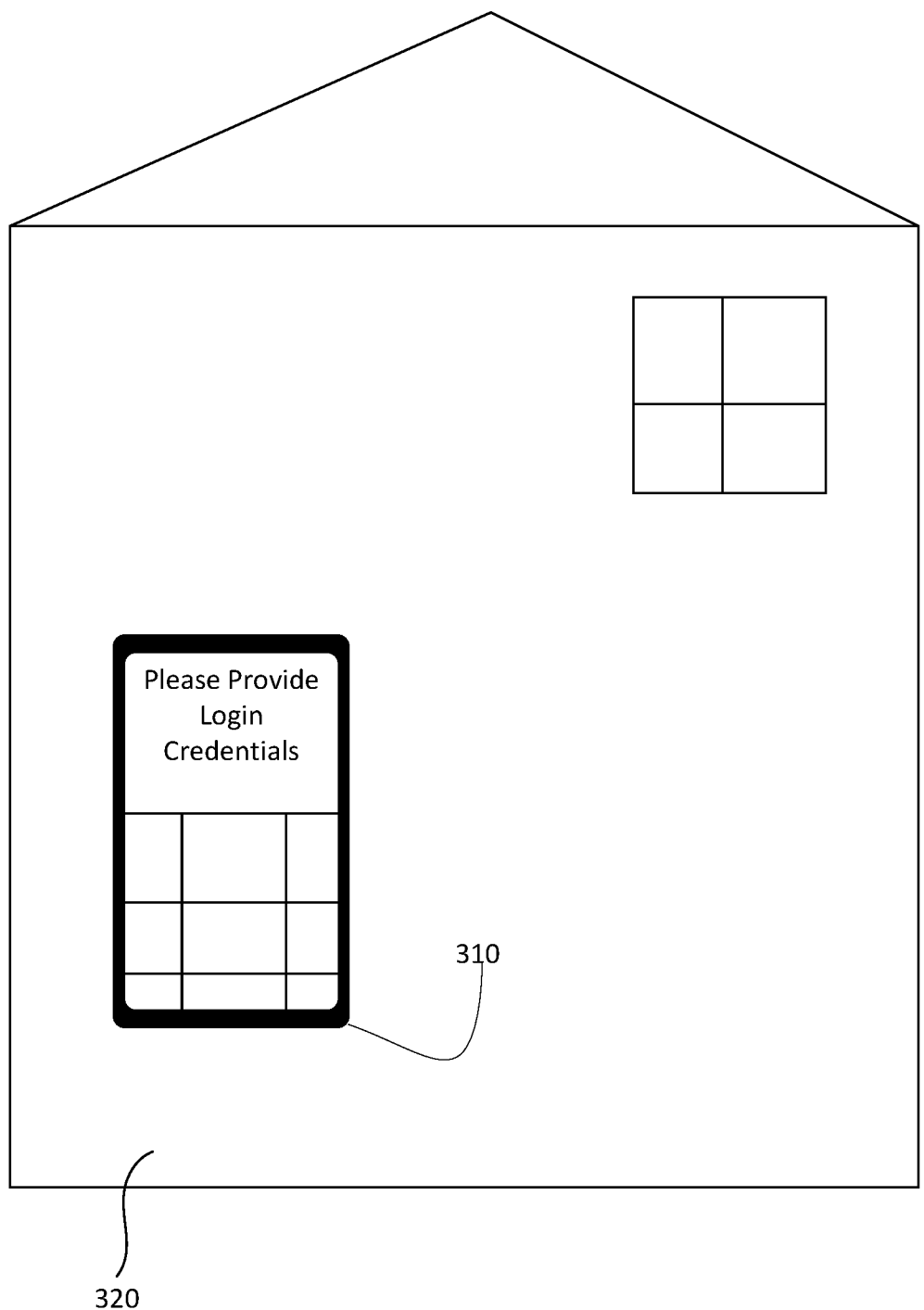
FIG. 3 shows a user device in a trusted location, according to an implementation of the disclosed subject matter.

As another illustrative example, as shown in FIG. 3, a mobile device 310 may be located in a home 320. While the mobile device 310 is in user's home 320, the user may access the mobile device 310 by inputting an alphanumeric password using the mobile device's touchscreen. The user may access mobile device 12 times within an hour, while located in the user's home 320. An event listener may detect that the mobile device 310 is in the home 320 and provide that information to a state storage. The event listener may also receive an indication that the mobile device 310 was unlocked 12 times within an hour while in the home 320. Both the location information as well as the unlocking 12 times information may be stored at a state storage. At a periodic check point, the information may be provide to an inference module. The inference module may also receive the current security configuration information corresponding to the alphanumeric password being required to gain access to the mobile phone, from a security configuration module. The inference module may the information in Table 2 available to it.

TABLE 2

| Information | Source |
| --- | --- |
| Located at home 320 | Event Listener |
| 12 unlocks within an hour | Event Listener |
| Alphanumeric password | Security Configuration module |

Continuing the example, the inference module may determine that if the home 320 is designated as a trusted location, trusted such that the security configuration can be modified to not require a simpler passcode such as a 2 digit number, then the user may save 40 seconds an hour unlocking her device.

As another example, an event listener may be configured to receive security updates from a central server. A security update may be provided that is related to mobile phones being stolen at a higher than usual rate in country A. The event listener may also receive the GPS coordinates for a user's mobile phone, the coordinates corresponding the location of country A (e.g., if the user is on vacation in country A). Both sets of information may be provided to an inference module. The inference module may also receive the current security configuration information corresponding to there being no password required to access banking information via the user's mobile phone, from a security configuration module. The inference module may the information in Table 3 available to it.

TABLE 3

| Information | Source |
| --- | --- |
| Located at coordinates for country A | Event Listener |
| No Password | Security Configuration module |

Continuing the example, the inference module may determine that if country A is designated as an untrusted location, then an alphanumeric password may provide a greater amount of security for a user's banking information.

Figure 5:
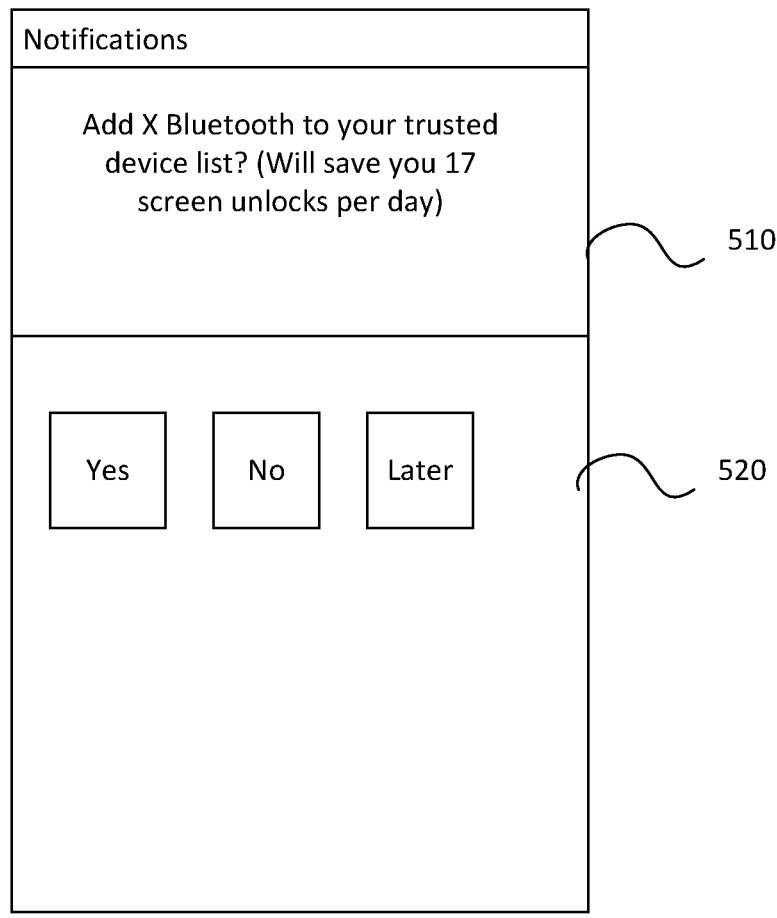
FIG. 5 shows an example suggestion interface for a user, according to an implementation of the disclosed subject matter.

According to an implementation of the disclosed subject matter, a suggestion corresponding to a security configuration change may be provided to a user. The suggestion may be generated by the inference module or by a suggestion UI. The suggestion may include a metric of expected improvement, a metric of expected security, or the like. As an example, an inference module may determine that if a Bluetooth headset X is designated as a trusted device, trusted such that the security configuration can be modified to not require a currently required 4 digit passcode, then the user may save 17 screen unlocks. Accordingly, a suggestion may be provided to the user, as shown in FIG. 5. The suggestion may ask the user to add X Bluetooth headset to her trusted device list and that doing so will save her 17 screen unlocks per day, as shown at 510. The user may opt to accept, deny, or postpone the change in security configuration. As another example, an inference module may determine that if a user's home is designated as a trusted location, trusted such that the security configuration can be modified of not require a currently required alphanumeric code, then the user may save 12 screen unlocks. Accordingly, a suggestion may be provided to the user that asks the user to add her home as a trusted location and that doing so will save 12 screen unlocks per day. As another example, an inference module may determine that a location, country A, has an increased theft rate. Accordingly, a suggestion may be provide to the user that asks the user to enable a more stringent security configuration to protect herself from loss of data.

According to an implementation of the disclosed subject matter, a user may accept the suggestion. For example, as shown in FIG. 5, a user may select the 'Yes' button. Based on receiving the acceptance, the current security configuration may be updated to conform to the security configuration change. As an example, if the suggestion is to add X Bluetooth headset as a trusted device, then the updated current security configuration may be such that if a user device is connected to X Bluetooth headset, then no password is required.

Figure 4:
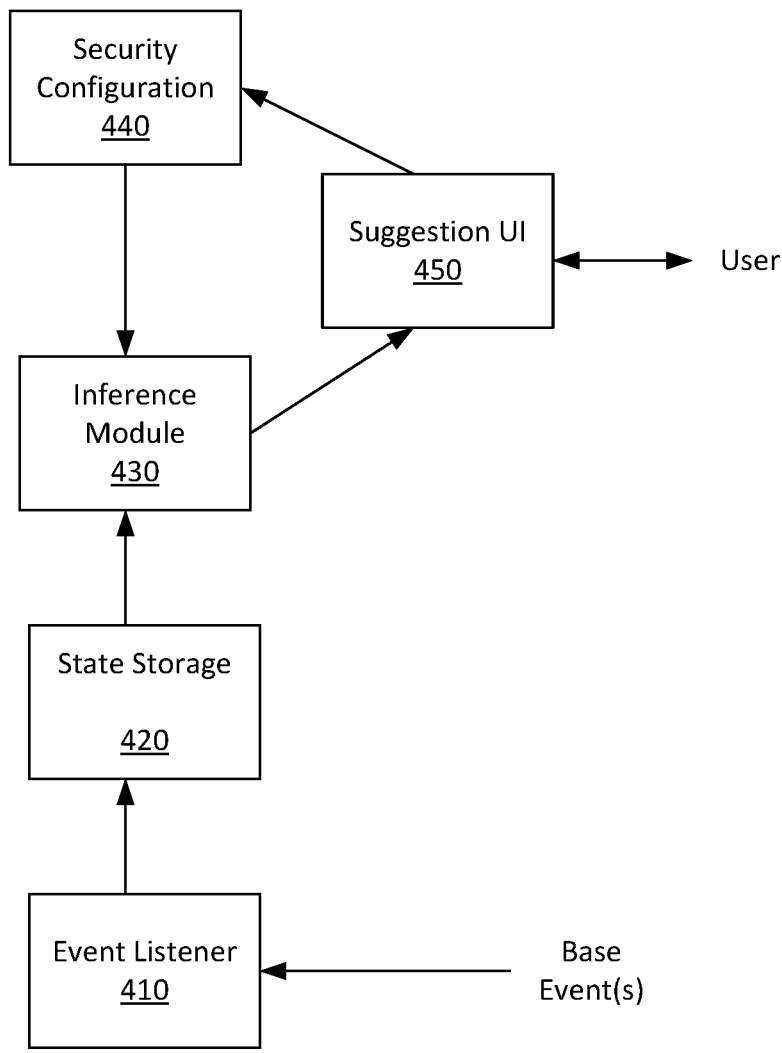
FIG. 4 shows a configuration for identifying a security configuration change, according to an implementation of the disclosed subject matter.

In an illustrative configuration, as shown in FIG. 4, one or more base events may be provided to an event listener 410. The one or more base events may be stored and/or summarized at a state storage 420. The summarized or un-summarized stored base events may be provided to an inference module 430. A security configuration module 440 may provide a current security configuration to the inference module 430. Based on the base events and current security configuration, the inference module may identify a security configuration change. The change may be provided to a suggestion UI 450 which generates a suggestion, which may include a metric of expected improvement or an expected security benefit. The suggestion UI 450 may provide the generated suggestion to a user. If the user accepts the suggestion, the suggestion UI 450 may provide the acceptance to the security module 440 and the current security configuration may be updated to reflect the change.

It will be understood that one or more of the components disclosed herein (e.g., event listener, state storage, inference module, suggestion UI, and security configuration module) may be part of one or more of other components. As an example, the state storage may also act as an event listener. Essentially, the components disclosed herein may be distinct hardware or software components or may be part of the same hardware or software component.

According to an implementation of the disclosed subject matter, an updated current security configuration may apply to multiple user devices. The multiple user devices may be associated with each other based on user designation, shared user accounts, or the like. As an example, if a security configuration change is identified based on a user's mobile phone, and the user opts to implement the security configuration change, then that change may apply to both the mobile phone as well as the user's tablet which is associated with the same user account as the mobile phone.

According to an implementation of the disclosed subject matter, a security configuration change may be identified based on a security level selection. A security level selection may be determined based on a user input, a manufacturer configuration, a dynamic determination, or the like. As an example, a user may select a security level by selecting a position on a sliding scale such that a position all the way to the right is most secure, a position all the way to the left is least secure, and a position between the right and a left follows a gradient. A more secure security level may result in a lower amount of identified change whereas a less secure security level may result in higher amounts of identified changes.

Figure 6:
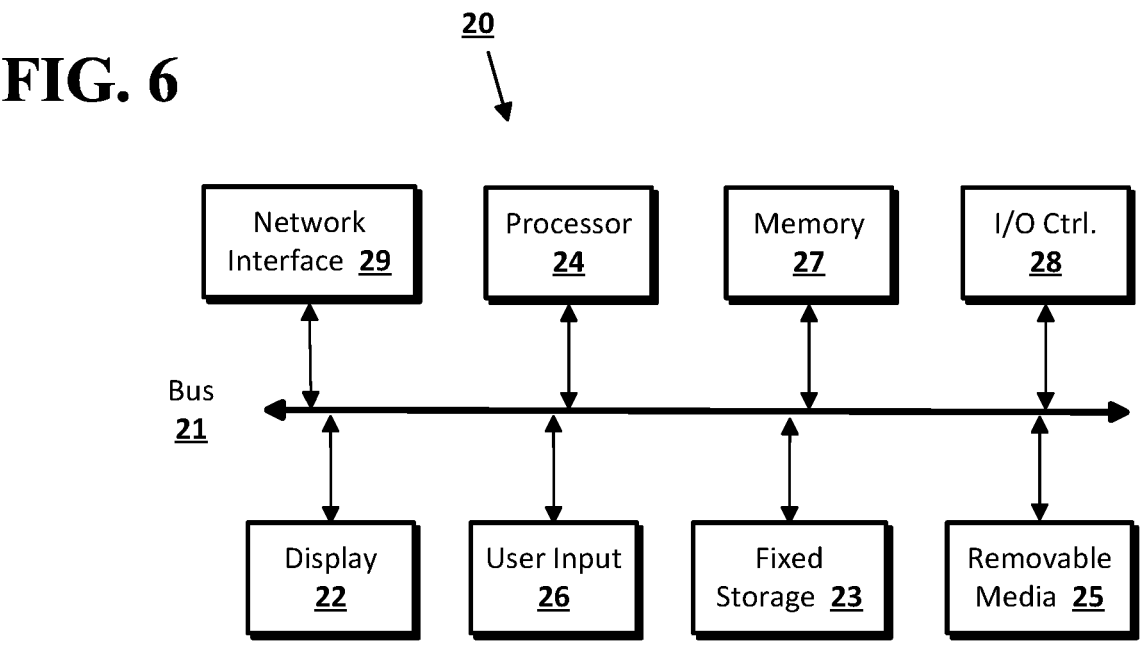
FIG. 6 shows a computer according to an implementation of the disclosed subject matter.

Implementations of the presently disclosed subject matter may be implemented in and used with a variety of component and network architectures. As an example, a mobile phone may be in connection with a cloud server and the cloud server may provide information to an event listener. FIG. 6 is an example computer 20 suitable for implementing implementations of the presently disclosed subject matter. The computer (e.g., mobile phone, tablet, laptop, etc.) 20 includes a bus 21 which interconnects major components of the computer 20, such as a central processor 24, a memory 27 (typically RAM, but which may also include ROM, flash RAM, or the like), an input/output controller 28, a user display 22, such as a display or touch screen via a display adapter, a user input interface 26, which may include one or more controllers and associated user input or devices such as a keyboard, mouse, WiFi/cellular radios, touchscreen, microphone/speakers and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 allows data communication between the central processor 24 and the memory 27, which may include read-only memory (ROM) or flash memory (neither shown), and random access memory (RAM) (not shown), as previously noted. The RAM can include the main memory into which the operating system and application programs are loaded. The ROM or flash memory can contain, among other code, the Basic Input-Output system (BIOS) which controls basic hardware operation such as the interaction with peripheral components. Applications resident with the computer 20 can be stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may allow the computer to communicate with other computers via one or more local, wide-area, or other networks, as shown in FIG. 7.

Many other devices or components (not shown) may be connected in a similar manner (e.g., document scanners, digital cameras and so on). Conversely, all of the components shown in FIG. 6 need not be present to practice the present disclosure. The components can be interconnected in different ways from that shown. The operation of a computer such as that shown in FIG. 6 is readily known in the art and is not discussed in detail in this application. Code to implement the present disclosure can be stored in computer-readable storage media such as one or more of the memory 27, fixed storage 23, removable media 25, or on a remote storage location.

Figure 7:
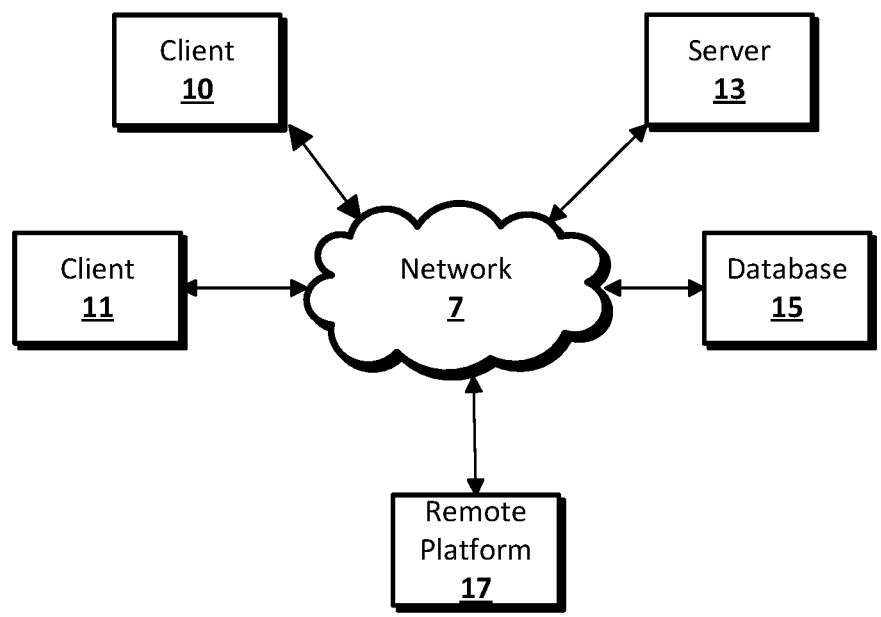
FIG. 7 shows a network configuration according to an implementation of the disclosed subject matter.

FIG. 7 shows an example network arrangement according to an implementation of the disclosed subject matter. One or more clients 10, 11, such as smart power devices, microcomputers, local computers, smart phones, tablet computing devices, and the like may connect to other devices via one or more networks 7 (e.g., a power distribution network). The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15.

More generally, various implementations of the presently disclosed subject matter may include or be implemented in the form of computer-implemented processes and apparatuses for practicing those processes. Implementations also may be implemented in the form of a computer program product having computer program code containing instructions implemented in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Implementations also may be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Implementations may be implemented using hardware that may include a processor, such as a general purpose microprocessor and/or an Application Specific Integrated Circuit (ASIC) that implements all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A method comprising:
receiving two or more base events at an event listener, wherein the two or more base events comprise at least a pairing of a mobile device with an external device, and one or more unlocks of the mobile device based on manual user password entry, the one or more unlocks occurring while the mobile device is paired with the external device and the mobile device is in a current security configuration in which a password is required to access the mobile device;
storing the two or more base events at a state storage;
providing the two or more base events stored at the state storage to an inference module;
providing the current security configuration to the inference module; and
identifying, by the inference module, a security configuration change based on a frequency of manual user password entries associated with the two or more base events and the current security configuration, wherein the security configuration change is to a setting where no password is required to access the mobile device while the mobile device is paired with the external device and the external device is designated as a trusted device.

2. The method of claim 1, further comprising providing a suggestion corresponding to the security configuration change, to a user.

3. The method of claim 2, wherein the suggestion includes a metric of expected improvement.

4. The method of claim 2, wherein the suggestion includes an expected security benefit.

5. The method of claim 2, further comprising:
receiving an acceptance of the suggestion, from the user; and
updating the current security configuration to conform to the security configuration change.

6. The method of claim 5, wherein the updated current security configuration applies to multiple user devices.

7. The method of claim 2, wherein the suggestion is generated by a suggestion UI.

8. The method of claim 1, wherein the two or more base events are two or more selected from the group consisting of: one or more unlocks, a pairing with an external device, a logon event, a sensor value, a security update and a device location.

9. The method of claim 1, wherein the two or more base events are two or more selected from the group consisting of an explicit event and an inferred event.

10. The method of claim 1, wherein the current security configuration is one or more selected from the group consisting of: a device lock timeout, a password strength, and a password type.

11. The method of claim 10, wherein a device lock timeout is a duration of device lock.

12. The method of claim 10, wherein a password strength is one or more selected from the group consisting of: a password length and a password complexity.

13. The method of claim 10, wherein a password type is one or more selected from the group consisting of: an alphanumeric password, a symbol based password, a gesture, a sequence, and a selection.

14. The method of claim 1, further comprising summarizing the two or more base events prior to providing the two or more base events.

15. The method of claim 1, wherein the current security configuration is provided by a user device for which the current security configuration applies to.

16. The method of claim 1, wherein the current security configuration is provided by one selected from the group consisting of: a local or remote database, a local or remote server, and a cloud server.

17. The method of claim 1, wherein the security configuration change is determined based on a security level selection.

18. A system comprising:
a processor configured to:
receive two or more base events at an event listener, wherein the two or more base events comprise at least a pairing of a mobile device with an external device, and one or more unlocks of the mobile device based on manual user password entry, the one or more unlocks occurring while the mobile device is paired with the external device and the mobile device is in a current security configuration in which a password is required to access the mobile device;

store the two or more base events at a state storage;

provide the two or more base events stored at the state storage to an inference module;

provide the current security configuration to the inference module; and identify, by the inference module, a security configuration change based on a frequency of manual user password entries associated with the two or more base events and the current security configuration, wherein the security configuration change is to a setting where no password is required to access the mobile device while the mobile device is paired with the external device and the external device is designated as a trusted device.

19. The system of claim 18, wherein the processor is further configured to provide a suggestion corresponding to the security configuration change to a user, wherein the suggestion includes a metric of expected improvement or an expected security benefit.

20. A non-transitory memory medium having stored thereon instructions that, when executed by one or more processors of a computer, cause the computer to perform operations comprising:

receiving two or more base events at an event listener, wherein the two or more base events comprise at least a pairing of a mobile device with an external device, and one or more unlocks of the mobile device based on manual user password entry, the one or more unlocks occurring while the mobile device is paired with the external device and the mobile device is in a current security configuration in which a password is required to access the mobile device;

storing the two or more base events at a state storage;

providing the two or more base events stored at the state storage to an inference module;

providing the current security configuration to the inference module; and identifying, by the inference module, a security configuration change based on a frequency of manual user password entries associated with the two or more base events and the current security configuration, wherein the security configuration change is to a setting where no password is required to access the mobile device while the mobile device is paired with the external device and the external device is designated as a trusted device.

* * * * *